(12) United States Patent
Omae et al.

(10) Patent No.: US 9,726,439 B2
(45) Date of Patent: Aug. 8, 2017

(54) TUBE AND HEAT EXCHANGER PROVIDED WITH TUBE

(71) Applicant: DENSO CORPORATION, Kariya, Aichi-pref. (JP)

(72) Inventors: Masahiro Omae, Kariya (JP); Hiroyasu Shimanuki, Anjo (JP); Norio Yoshida, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 332 days.

(21) Appl. No.: 14/390,334

(22) PCT Filed: Mar. 25, 2013

(86) PCT No.: PCT/JP2013/001983
§ 371 (c)(1),
(2) Date: Oct. 2, 2014

(87) PCT Pub. No.: WO2013/150738
PCT Pub. Date: Oct. 10, 2013

(65) Prior Publication Data
US 2015/0107813 A1 Apr. 23, 2015

(30) Foreign Application Priority Data
Apr. 4, 2012 (JP) .................. 2012-085709

(51) Int. Cl.
*F28F 1/14* (2006.01)
*F28D 1/02* (2006.01)
(Continued)

(52) U.S. Cl.
CPC .............. *F28F 1/006* (2013.01); *B23K 1/008* (2013.01); *B23K 1/0012* (2013.01); *B23K 1/14* (2013.01);
(Continued)

(58) Field of Classification Search
CPC ........ F28F 1/08; F28F 1/20; F28F 1/40; F28F 3/025; F28F 2275/04; F28F 2275/045;
(Continued)

(56) References Cited

U.S. PATENT DOCUMENTS 4,561,494 A * 12/1985 Frost ..................... F28D 9/0012
165/109.1
5,036,909 A * 8/1991 Whitehead ............ F28D 1/0391
165/133
(Continued)

FOREIGN PATENT DOCUMENTS

JP 6370479 U 5/1988
JP 2002243385 A 8/2002
(Continued)

OTHER PUBLICATIONS

Office Action dated Nov. 4, 2015, issued in the corresponding CN application No. 201380017132.9 in Chinese with English translation.
(Continued)

*Primary Examiner* — Ryan J Walters
*Assistant Examiner* — Jason Thompson
(74) *Attorney, Agent, or Firm* — Harness, Dickey & Pierce, P.L.C.

(57) ABSTRACT

A tube used in a heat exchanger, wherein a tube body includes a curved end portion, a pair of parallel portions, a pair of inclination portions, and a fixed portion in which a long end part extending from one of the pair of inclination portions is bent to hold therebetween a short end part extending from the other of the pair of inclination portions, and the tube is a pipe member having a flattened shape in cross-section. Poor brazing is reduced by making the incli-
(Continued)

nation angle of at least part of the other inclination portion with respect to the flat plate portion larger than that of the one inclination portion.

6 Claims, 6 Drawing Sheets

(51) Int. Cl.
| | |
|---|---|
| F28F 3/14 | (2006.01) |
| F28F 1/00 | (2006.01) |
| F28F 3/02 | (2006.01) |
| F28D 1/03 | (2006.01) |
| F28D 1/053 | (2006.01) |
| B23K 1/00 | (2006.01) |
| B23K 33/00 | (2006.01) |
| B23K 1/14 | (2006.01) |
| B23K 1/008 | (2006.01) |
| F28D 7/00 | (2006.01) |
| B23K 101/14 | (2006.01) |
| F28D 21/00 | (2006.01) |

(52) U.S. Cl.
CPC .......... B23K 33/002 (2013.01); F28D 1/0391 (2013.01); F28D 1/05383 (2013.01); F28D 7/00 (2013.01); F28F 3/025 (2013.01); B23K 2201/14 (2013.01); F28D 2021/0084 (2013.01)

(58) Field of Classification Search
CPC ........ F28F 3/10; F28F 1/405; F28F 2001/428; F28D 1/05335; F28D 1/05383; F28D 1/05333; B21D 53/06; B21D 53/02; B23P 15/26; B23K 1/0012; B23K 2201/14
USPC ........ 165/170, 173, 174, 175, 153; 288/183, 288/245–262
See application file for complete search history.

(56) References Cited

U.S. PATENT DOCUMENTS

| | | | | |
|---|---|---|---|---|
| 5,372,188 | A | * | 12/1994 | Dudley ................ F25B 39/04 165/110 |
| 2004/0238605 | A1 | * | 12/2004 | Nishimura ......... B23K 35/0238 228/264 |
| 2006/0086491 | A1 | * | 4/2006 | Ueda ...................... B21D 53/02 165/177 |
| 2007/0095514 | A1 | * | 5/2007 | Inoue ..................... B21D 53/02 165/177 |
| 2007/0144722 | A1 | * | 6/2007 | Matsuzaki ............ B21C 37/151 165/177 |
| 2009/0218085 | A1 | | 9/2009 | Rogers et al. |
| 2010/0051252 | A1 | | 3/2010 | Ninagawa et al. |
| 2010/0258288 | A1 | * | 10/2010 | Krantz ................. B23K 1/0012 165/185 |
| 2012/0031601 | A1 | * | 2/2012 | Matter, III .......... F28D 1/05383 165/177 |
| 2013/0220585 | A1 | * | 8/2013 | Oohara ................... B21C 37/14 165/169 |

FOREIGN PATENT DOCUMENTS

| | | | |
|---|---|---|---|
| JP | 2005121295 | A | 5/2005 |
| JP | 2007107755 | A | 4/2007 |
| JP | 2007113895 | A | 5/2007 |
| JP | 2007125590 | A | 5/2007 |
| JP | 2009019799 | A | 1/2009 |
| JP | 2009524000 | A | 6/2009 |
| JP | 2009229052 | A | 10/2009 |

OTHER PUBLICATIONS

Office Action mailed Sep. 1, 2015 in corresponding Japanese Application No. 2012-085709 with English translation.
International Search Report and Written Opinion (in Japanese with English Translation) for PCT/JP2013/001983, mailed Jun. 18, 2013; ISA/JP.

* cited by examiner (a)

(b)

(a)

(b)

TUBE AND HEAT EXCHANGER PROVIDED WITH TUBE

CROSS REFERENCE TO RELATED APPLICATIONS

This application is a U.S. National Phase Application under 35 U.S.C. 371 of International Application No. PCT/JP2013/001983 filed on Mar. 25, 2013 and published in Japanese as WO 2013/150738 A1 on Oct. 10, 2013. This application is based on and claims the benefit of priority from Japanese Patent Application No. 2012-085709 filed on Apr. 4, 2012. The entire disclosures of all of the above applications are incorporated herein by reference.

TECHNICAL FIELD

The present disclosure relates to a tube and a heat exchanger provided with the tube.

BACKGROUND ART

Conventionally, a heat exchanger, which includes a core portion in that multiple tubes and outer fins are arranged to be stacked alternately, and a header tank having a through hole through which an end part of each tube are inserted, is known as a heat exchanger for a vehicular air conditioner (e.g., Patent Document 1). In the heat exchanger, the respective components are brazed with each other. In the above-described conventional heat exchanger, the tube is obtained by bending a plate member and fixing both end parts of the plate member to each other, and the tube has a flattened shape in cross section. Accordingly, the tube includes a curved end portion, a pair of flat plate portions opposed to each other, a fixed portion in which one end part of the plate member is bent to hold the other end part of the plate member on an opposite side from the curved end portion, and an inclined portion connecting the fixed portion and the flat plate portion.

PRIOR ART DOCUMENT

Patent Document

Patent Document 1: JP 2007-125590 A

SUMMARY OF THE INVENTION

However, according to a study of the inventors of the present application, in the tube of the heat exchanger disclosed in Patent Document 1, a clearance is provided between the one end part of the plate member bent to hold the other end part of the plate member in the fixed portion and the inclined portion extending continuously from the other end part of the plate member. Hence, when the tube is inserted into the through hole of the header tank, an interspace between an edge defining the through hole and an outer peripheral surface of the tube is larger in a position where the above-described clearance is provided than in the other positions. Therefore, in the position where the above-described clearance is provided, poor brazing between the tube and the header tank is likely to be caused by a shortage of a brazing filler material.

The present disclosure is to provide a tube or a heat exchanger using the tube, which is capable of reducing poor brazing by narrowing a clearance S between an inclination portion of the tube and a plate member of the tube in a fixed portion located at an end part on a fixed side of a parallel portion of the tube.

According to a first aspect of the present disclosure, a tube is used for a heat exchanger, and the tube includes a flow passage therein and has a flattened shape in cross section. The tube includes a curved end portion in which an elongated plate member is curved, a pair of flat plate portions connected to the curved end portion and disposed to be opposed and substantially parallel to each other, a pair of inclination portions extending inward from the pair of flat plate portions to be inclined with respect to the pair of flat plate portions, and a fixed portion in which a long end part extending from one of the pair of inclination portions is bent to hold a short end part extending from the other of the pair of inclination portions. At least a part of the other inclination portion is larger in an inclination angle with respect to the flat plate portion than the one inclination portion.

According to a second aspect of the present disclosure, the other inclination portion may include a first inclined surface part larger than the one inclination portion in inclination angle with respect to the flat plate portion, and a second inclined surface part substantially the same as the one inclination portion in the inclination angle with respect to the flat plate portion. The first inclined surface part may be disposed between the short end part and the second inclined surface part. According to a third aspect of the present disclosure, a part of the long end part, which is opposed to the inclination portion, may have a tapered surface inclined along the inclination portion. According to a fourth aspect of the present disclosure, the other inclination portion may include a protrusion part having a curved shape protruding outward.

According to a fifth aspect of the present disclosure, a tube is used for a heat exchanger, and the tube includes a flow passage therein and has a flattened shape in cross section. The tube includes a curved end portion in which an elongated plate member is curved, a pair of flat plate portions connected to the curved end portion and disposed to be opposed and substantially parallel to each other, a pair of inclination portions extending inward from the pair of flat plate portions to be inclined with respect to the pair of flat plate portions, and a fixed portion in which a long end part extending from one of the pair of inclination portions is bent to hold a short end part extending from the other of the pair of inclination portions. The bent long end part extends to the other inclination portion and is in surface contact with the other inclination portion.

According to a sixth aspect of the present disclosure, an end surface of the long end part may be coplanar with an outer surface of the flat plate portion. According to a seventh aspect of the present disclosure, a heat exchanger may include the tubes described in any one of the above-described aspects, a core portion having outer fins alternating with the tubes and being stacked, and a header tank having a through hole through which end parts of the tubes are inserted.

According to the present disclosure, a clearance between the inclination portion of the tube and an end part of a plate member configuring the tube is reduced. Hence, an interspace between an outer peripheral surface of the tube and an edge defining the through hole can be reduced in a position where the clearance is provided. When the tube is inserted into the through hole, an amount of a brazing filler material flowing into the clearance due to the capillary action can be reduced. Thus, poor brazing in a base part of the tube can be restricted. As a result, tubes or a heat exchanger using the tubes, in which there is no possibility of leakage from base parts of the tubes due to a shortage of the brazing filler material, can be provided.

EMBODIMENTS FOR EXPLOITATION OF THE INVENTION

Figure 1:
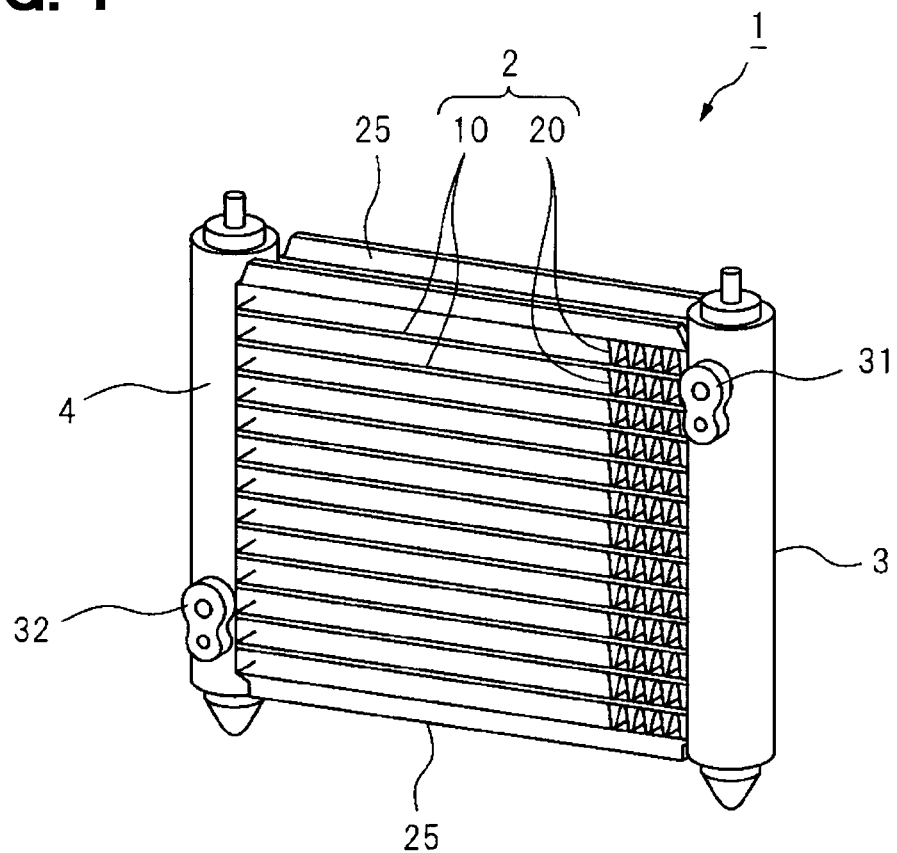
FIG. 1 is a perspective view showing a heat exchanger according to a first embodiment of the present disclosure.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

As shown in FIG. 1, a refrigerant condenser 1 used for a vehicular air conditioner, which is an example of a heat exchanger to which the present disclosure is applied, includes a core portion 2 having multiple tubes 10 and outer fins 20 arranged to be stacked alternately and performing a heat exchange between a refrigerant flowing in the tubes 10 and a passing air, header tanks 3 and 4 connected to end parts of the tubes 10, and side plates 25 that are reinforcing agents disposed on outer sides of the core portion 2 in a stacking direction of the tubes 10. One of the header tanks 3 has an inflow part 31 through which a refrigerant flows into an inside of the header tank 3 from a compressor (not shown), and the other of the header tanks 4 has an outflow part 32 through which the refrigerant flows out of the header tank 4.

The tube 10, in which an inner fin 12 (described later) is provided, is attached to the header tanks 3 and 4 so as to be inserted into through holes (not shown) formed on the header tanks 3 and 4, and subsequently is brazed integrally in a furnace.

Figure 2:
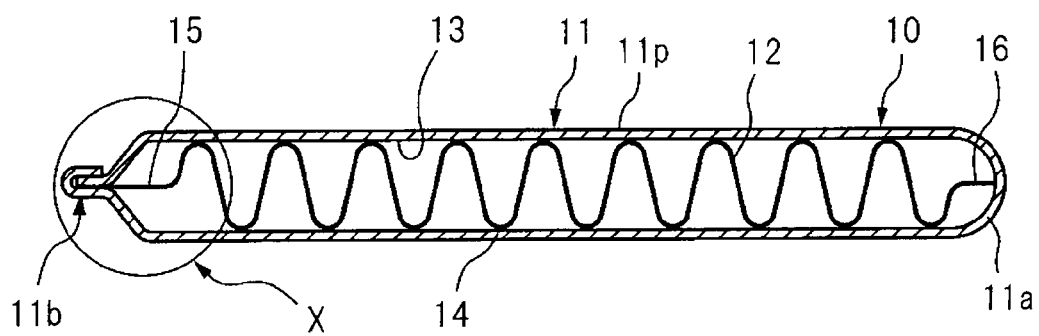
FIG. 2 is a sectional diagram taken along a direction perpendicular to a longitudinal direction of the tube used in the heat exchanger according to the first embodiment.

As shown in FIG. 2, the tube 10 is a tubular member having a flattened shape in cross section. Inside the tube 10, the inner fin 12 is disposed for increasing an efficiency of heat exchange between the refrigerant and the passing air. The tube 10 is formed by bending an approximately center part of an elongated aluminum plate member in width (e.g., thickness is from 0.15 to 0.3 mm), which is clad with a brazing filler material on its surface. Thus, the tube 10 has a curved end portion 11a curved into an arc-like shape on one end of the tube 10 in its width direction. A pair of flat plate portions 11p disposed to be opposed to each other extends from the curved end portion 11a, and a fixed portion 11b is provided on an opposite side of the pair of flat portions 11p from the curved end portion 11a.

Figure 3:
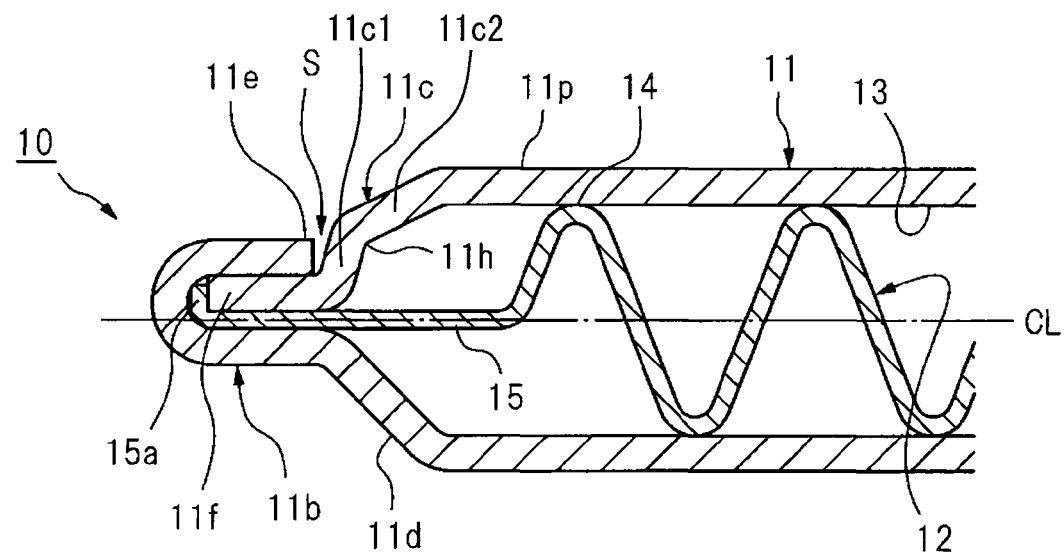
FIG. 3 is a sectional diagram showing an X part of FIG. 2.

FIG. 3 is an enlarged diagram showing an X part of FIG. 2. When the elongated plate member configuring the a tube body 11 is bent to provide the curved end portion 11a, lengths from the curved end portion 11a to both end part of the elongated plate member are different from each other. The flat plate portions 11p are bent inward at positions substantially the same distance away from the curved end portion 11a, thereby providing inclination portions 11c and 11d.

The longer end part (long end part) 11e of the plate member is provided seamlessly with the inclination portion 11d, and the shorter end part (short end part) 11f is provided seamlessly with the inclination portion 11c. The longer end part 11e of the plate member is bent to hold therebetween the shorter end part 11f and an end part 15a of a flat portion 15 of the inner fin 12, thereby providing a fixed portion 11b.

The inclination portion 11c has a protrusion part 11h bent to protrude outward of the tube body 11 in the vicinity of a position opposed to an end part 11e of the plate member. An inclination angle of the inclination portion 11c adjacent to the end part 11e of the plate member is larger than an inclination angle of the inclination portion 11c in the other region. More specifically, the inclination portion 11c includes a first inclination part 11c1 larger than the inclination portion 11d in inclination angle with respect to the flat plate portion 11p, and a second inclination part 11c2 approximately the same as the inclination portion 11d in inclination angle with respect to the flat plate portion 11p. Consequently, an end of the end part 11e of the plate member can be positioned to be close to the first inclination part 11c1 of the inclination portion 11c, and thus a clearance S between the end part 11e of the plate member and the inclination portion 11c can be reduced. Therefore, when the header tanks 3 and 4 are attached to the tubes 10, a large interspace can be prevented from generating locally between an edge defining the through hole of the header tank 3, 4 and an outer peripheral surface of the tube 10. Poor brazing of a base part that is a brazed part between the tube 10 and the header tank 3, 4 can be limited.

Since the clearance S is reduced, an amount of the brazing filler material flowing into the clearance S from the fixed portion 11b due to the capillary action becomes less. Thus, a shortage of the brazing filler material for brazing between the edge defining the through hole of the header tank 3, 4 and the outer peripheral surface of the tube 10 can be prevented, and the poor brazing can be restricted. Hence, it is unnecessary to increase an amount of the brazing filler material applied to the plate member that configures the tube 10. The protrusion part 11h can be made also into a shape bulged outward instead of making the inclination portion 11c into the bent shape.

A line dividing a distance between outer walls of the flat plate portions 11p in half is defined as a center line CL. An angle of a part of the inclination portion 11c between the protrusion part 11h and the flat plate portion 11p with respect to the center line CL is configured to be the same as an angle of the inclination portion 11d with respect to the center line CL. Hence, a cross-sectional shape of the tube 10 in the longitudinal direction can be made to be approximately line-symmetric about the center line CL, and the tube 10 can be thus attached to the through hole of the header tank 3, 4 regardless of direction of the tube 10.

The fixed portion 11b can be lengthened, and deformation of the tube 10 can be limited after fixing of the fixed portion 11b.

The inner fin 12 is formed into a corrugated shape by roll-forming an elongated and thin aluminum plate (e.g., thickness is from 0.05 to 0.25 mm), similar to the tube body 11. The flat portions 15 and 16 are provided on both end parts of the inner fin 12 (see FIG. 2). An end part 15a of the flat portion 15 of the inner fin 12 is fixed in the fixed portion 11b. The inner fin 12 is attached to the tube body 11 such that folded parts 14 of a corrugated part of the inner fin 12 contact an inner wall surface 13 of the tube body 11. The inner fin 12 is attached to the tube body 11 such that the first folded part 14 connected seamlessly to the flat portion 15 of the inner fin 12 is in contact with the flat plate portion 11p connected seamlessly to the end part 11f held by the bent end part 11e of the plate member in the fixed portion 11b.

The end part 15a of the flat portion 15 of the inner fin 12 is bent along an inner circumferential shape of a bent part of the end part 11e of the plate member. Thus, a gap between the end part 11f of the plate member and an inner circumferential surface of the bent part of the end part 11e of the plate member can be reduced. Therefore, in brazing, an amount of the brazing filler material flowing to the bent part of the end part 11e due to capillary action can be reduced in the fixed portion 11b, and a sufficient amount of the brazing filler material can be supplied to the clearance S. As a result, poor brazing between the edge defining the through hole of the header tank 3, 4 and the outer peripheral surface of the tube 10 can be restricted, and accordingly poor brazing of the base part of the tube 10 can be limited.

(Second Embodiment)

Figure 4:
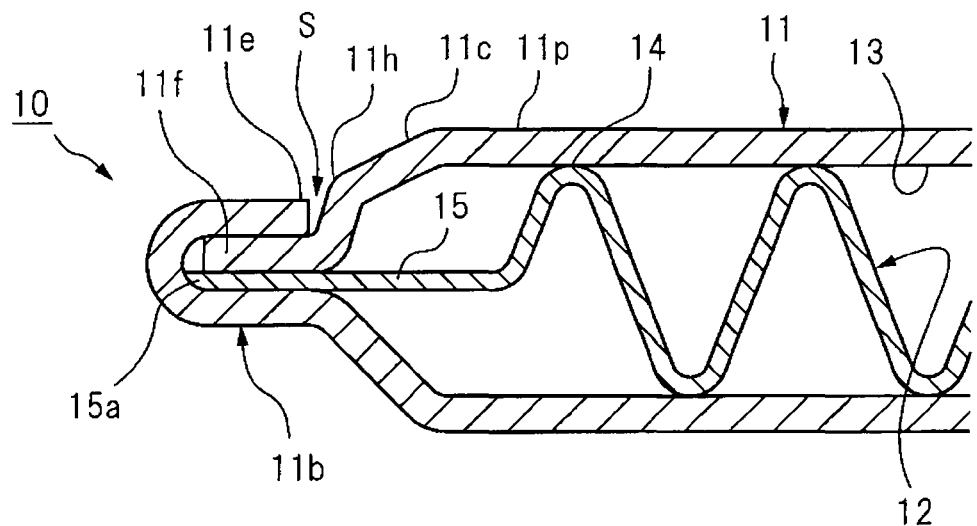
FIG. 4 is a sectional diagram showing a part of a tube according to a second embodiment of the present disclosure.

In the above-described first embodiment, the end part 15a of the flat portion 15 of the inner fin 12 is formed into the bent shape, but, as shown in FIG. 4, an end part 15a of a flat portion 15 of an inner fin 12 may be formed into a flat plate shape so as to be in contact with an inner circumferential surface of a bent part of an end part 11e of a plate member. According to such a shape, a gap required to be filled can be reduced.

Hence, an amount of the brazing filler material applied to the plate member and flowing toward the bent part of the end part 11e of the plate member due to capillary action in the fixed portion 11b can be reduced. A sufficient amount of the brazing filler material can be accordingly supplied to the clearance S. As a result, poor brazing between an edge defining a through hole of a header tank 3, 4 and an outer peripheral surface of a tube 10 can be limited, and poor brazing in a base part of the tube 10 can be restricted.

(Third Embodiment)

Figure 5:
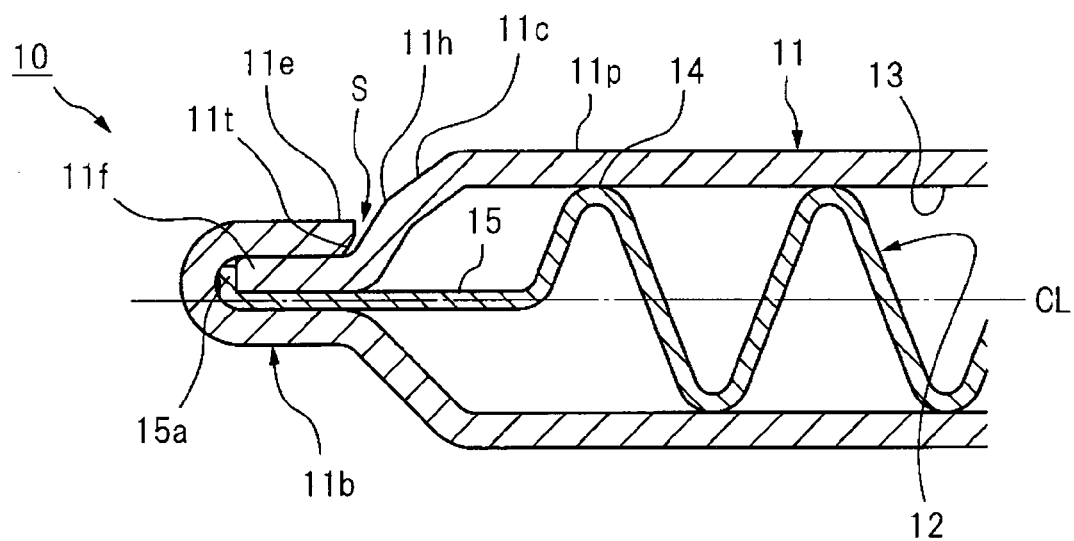
FIG. 5 is a sectional diagram showing a part of a tube according to a third embodiment of the present disclosure.

As shown in FIG. 5, a longer end part 11e of an elongated plate member may be lengthened toward an inclination portion 11c, and a part of the end part 11e, opposed to the inclination portion 11c, may have a tapered surface 11t inclined along the inclination portion 11c. By providing the tapered surface 11t, the end part 11e can be made to be closer to the inclination portion 11c. As a result, in comparison with the first embodiment, a clearance S between the end part 11e and the inclination portion 11c can be made to be smaller. Poor brazing between an edge defining a through hole of a header tank 3, 4 and an outer peripheral surface of a tube 10 can be limited accordingly, and poor brazing in a base part of the tube 10 can be restricted.

(Fourth Embodiment)

Figure 6:
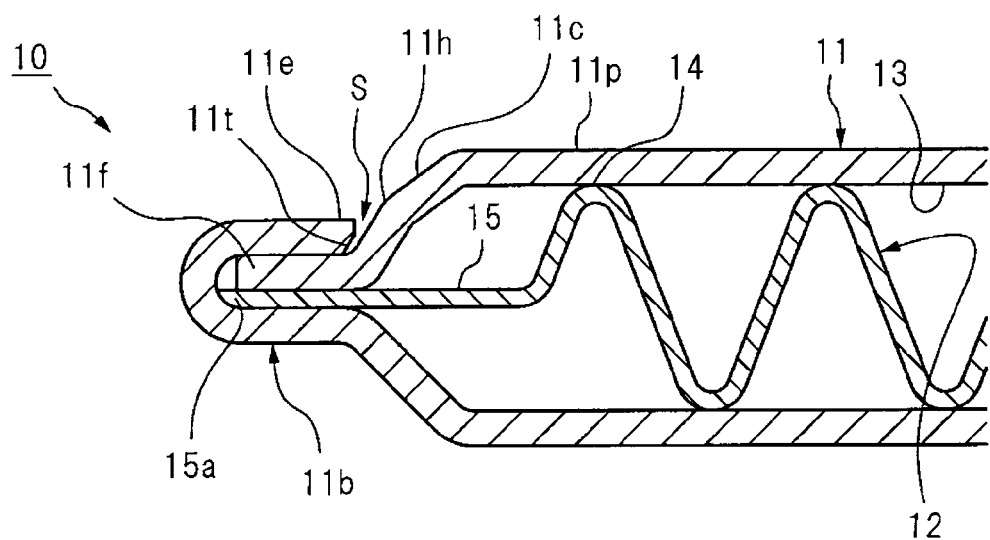
FIG. 6 is a sectional diagram showing a part of a tube according to a fourth embodiment of the present disclosure.

In a fourth embodiment shown in FIG. 6, the shape of the end part 15a of the flat portion 15 of the inner fin 12 described in the second embodiment and the structure of the end part 11e having the tapered surface 11t described in the third embodiment are combined, and similar effects can be obtained in this case.

(Fifth Embodiment)

Figure 7:
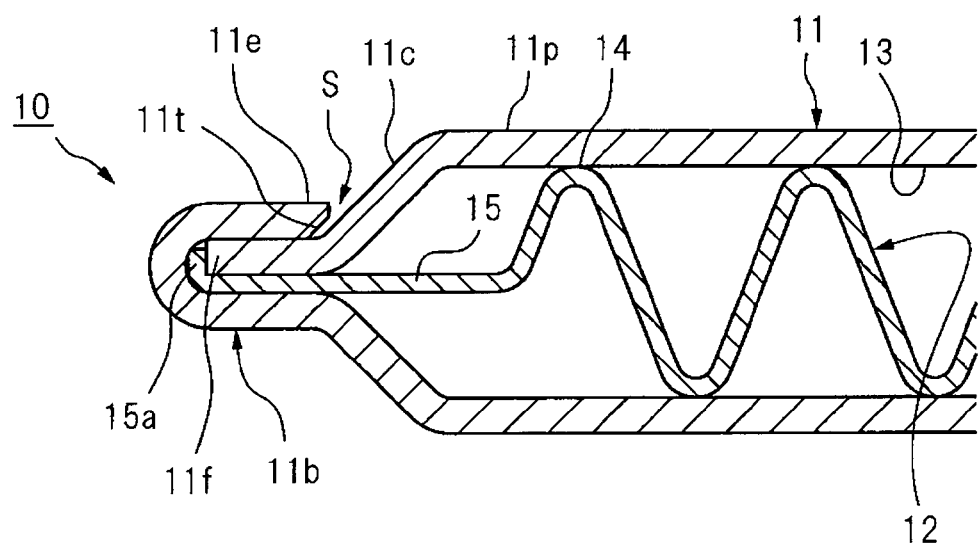
FIG. 7(a) is a sectional diagram showing a part of a tube according to a fifth embodiment of the present disclosure.
FIG. 7(b) is a sectional diagram showing a brazed state of a fixed portion of FIG. 7(a).
Figure 7:
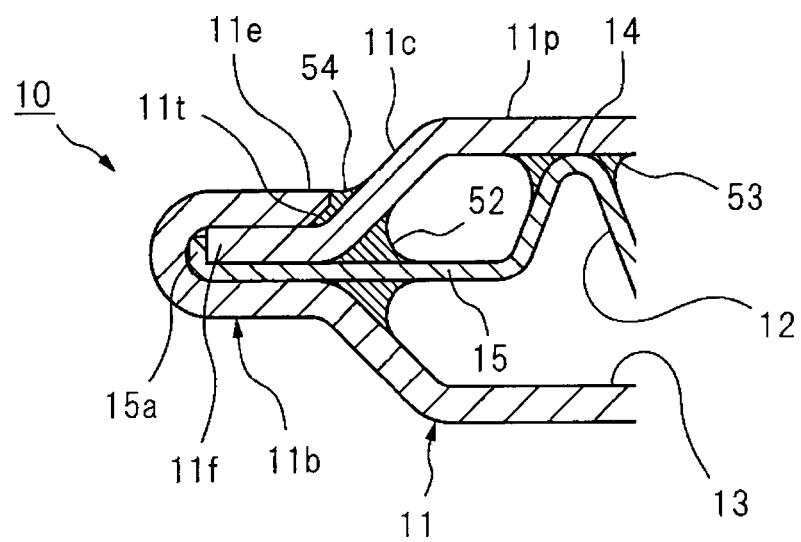

FIGS. 7(a) and 7(b) show a fifth embodiment of a tube 10 used in a heat exchanger of the present disclosure. A longer end part 11e of an elongated plate member is lengthened toward an inclination portion 11c, and a part of the end part 11e, opposed to the inclination portion 11c, includes a tapered surface 11t.

In the fifth embodiment, the longer end part 11e of the elongated plate member is lengthened toward the inclination portion 11c, and the part of the end part 11e, opposed to the inclination portion 11c, includes the tapered surface 11t. By providing the tapered surface 11t on the opposed part of the end part 11e to the inclination portion 11c, the length of the end part 11e can be increased. As a result, a clearance S between the end part 11e and the inclination portion 11c can be narrowed, and an amount of a brazing filler material flowing into the clearance S can be reduced in the fixed portion 11b. Consequently, even when a tube 10 is formed by using a plate member cladded with a small amount of the brazing filler material, fillets 52, 53, 54 can be formed sufficiently.

Similar to the first embodiment, an end part 15a of a flat portion 15 of an inner fin 12 is bent along an inner circumferential shape of a bent part of the end part 11e of the plate member. Thus, an amount of the brazing filler material flowing to the bent part of the end part 11e of the plate member due to capillary action in the fixed portion 11b can be reduced, and a sufficient amount of the brazing filler material can be supplied to the clearance S. Consequently, poor brazing between an edge defining a through hole of header tanks 3, 4 and an outer peripheral surface of the tube 10 can be limited, and poor brazing in a base part of the tube 10 can be thereby restricted.

(Sixth Embodiment)

Figure 8:
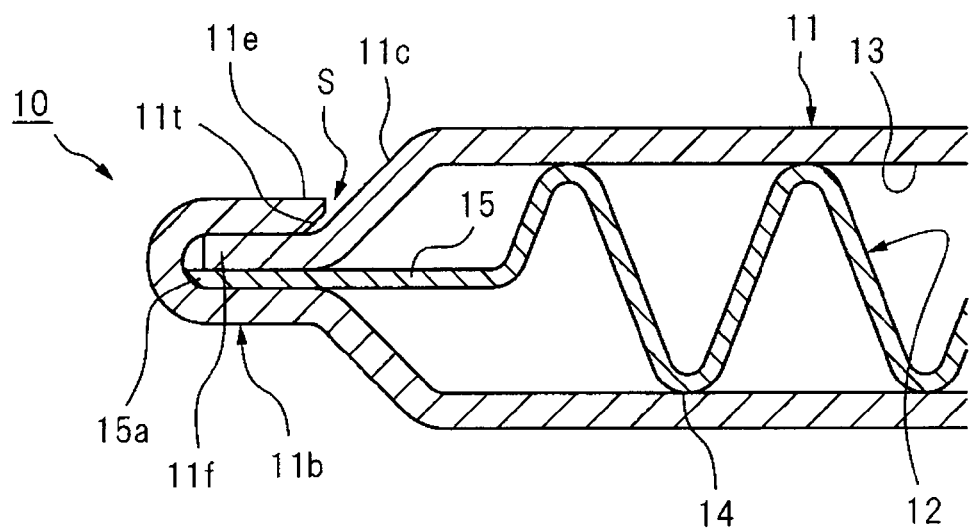
FIG. 8(a) is a sectional diagram showing a part of a tube according to a sixth embodiment of the present disclosure.
FIG. 8(b) is a sectional diagram showing a brazed state of a fixed portion of FIG. 8(a).
Figure 8:
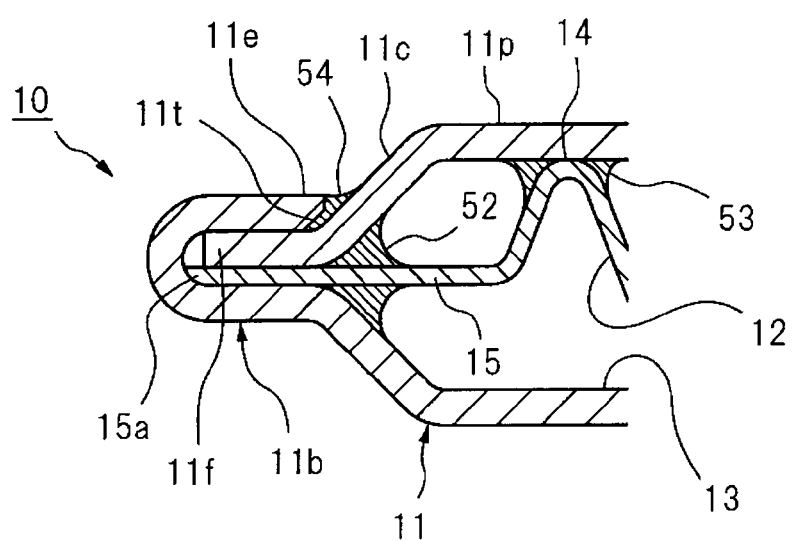

FIG. 8(a) shows a sixth embodiment of a tube 10 used for a heat exchanger of the present disclosure. Similar to the second embodiment, an end part 15a of a flat portion 15 may be made into a flat plate shape, and the shape contacting an inner circumferential surface of a bent part of an end part 11e of a plate member may be applied to the fifth embodiment. A brazing filler material applied to the plate member can be reduced in flow amount to the bent part of the end part 11e of the plate member due to capillary action in a fixed portion 11b. A sufficient amount of the brazing filler material can be supplied to the clearance S.

As a result, poor brazing between an edge defining a through hole of header tanks 3, 4 and an outer peripheral surface of the tube 10 can be limited, and poor brazing in a base part of the tube 10 can be thereby restricted.

(Seventh Embodiment)

Figure 9:
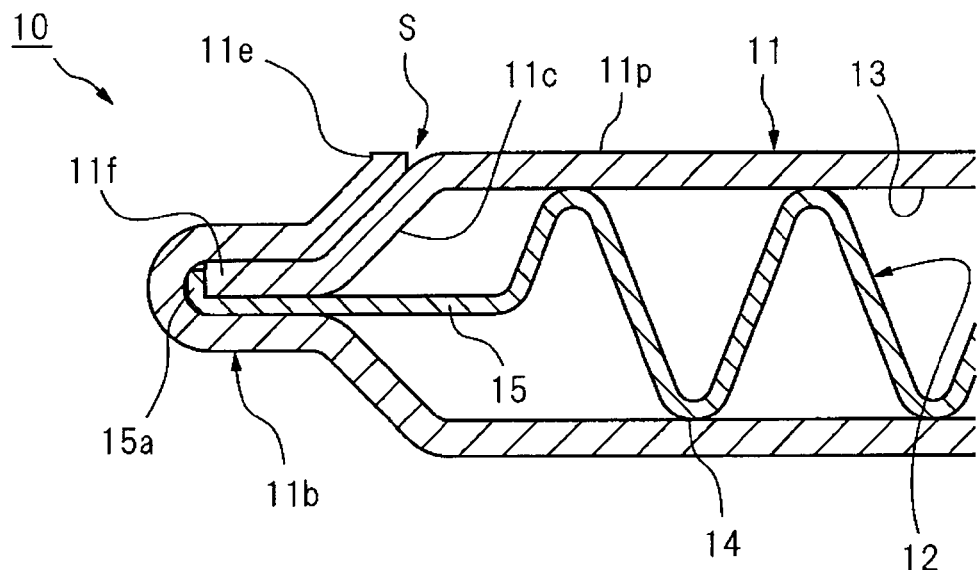
FIG. 9 is a sectional diagram showing a part of a tube according to a seventh embodiment of the present disclosure.

In a seventh embodiment, as shown in FIG. 9, a longer end part 11e of an elongated plate member is lengthened toward an inclination portion 11c and is overlapped with an inclined plane of the inclination portion 11c, thereby providing a double inclined-plane structure. An end of the end part 11e is bent not to cross over an extended line of the flat plate portion 11p. As a result, a clearance between the end part 11e and the inclination portion 11c can be narrowed, and an amount of a brazing filler material filled in the clearance S can be reduced. Since the clearance S is brazed with a small amount of the brazing filler material, brazing quality in a base part of a tube 10 can be improved.

(Eighth Embodiment)

Figure 10:
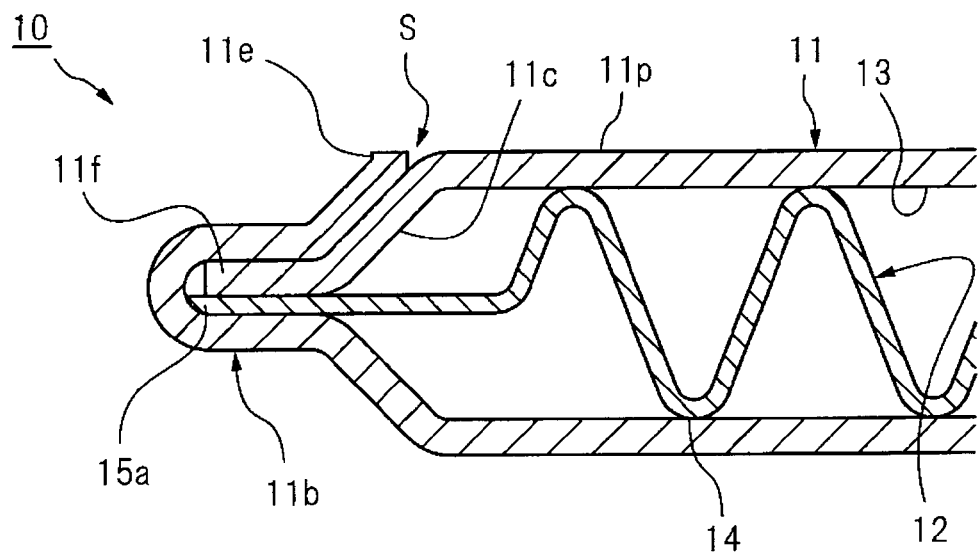
FIG. 10 is a sectional diagram showing a part of a tube according to an eighth embodiment of the present disclosure.

FIG. 10 shows an eighth embodiment of a tube 10 used for a heat exchanger of the present disclosure. The shape of the end part 15a of the flat portion 15 described in the second embodiment is applied to the seventh embodiment. In such a structure also, brazability can be improved.

As described above, in the present disclosure, since the clearance S between the plate member of the tube 10 in the fixed portion 11b of the tube 10 and the inclination portion 11c of the tube 10 is narrowed, brazing between the outer peripheral surface of the tube 10 and the edge defining the through hole of the header tank 3, 4 can be performed successfully. Sufficient brazing can be performed without increasing unnecessarily an amount of the brazing filler material applied to the plate member configuring the tube 10.

In the above-described embodiments, the tube having therein the inner fin is described, but may be just a tube having a flattened shape in cross section and being obtained by bending a plate member and crimp-fixing both ends of the plate member to each other. The present disclosure is applicable to the tube in which the inner fin is not provided.

In the above-described embodiments, the header tank provided integrally with the header tank is described, but the present disclosure is applicable to a heat exchanger including a header tank separated into a header plate having a through hole for the tube and a tank portion covering the header plate.

Moreover, in the above-described embodiments, it is described as an example that the present disclosure is applied to the condenser of the vehicular air conditioner, but the present disclosure is applicable to a refrigerant evaporator or a radiator. A usage of the heat exchanger to which the present disclosure is applied is not limited.

What is claimed is:

1. A tube used for a heat exchanger, the tube including therein a flow passage and having a flattened shape in cross section, the tube comprising:
   a curved end portion in which an elongated plate member is curved;
   a pair of flat plate portions connected to the curved end portion and disposed to face each other;
   a pair of inclination portions extending inward from the pair of flat plate portions to be inclined with respect to the pair of flat plate portions; and
   a fixed portion in which a long end part extending from one of the pair of inclination portions is bent to hold therebetween a short end part extending from the other of the pair of inclination portions, wherein
   the one of the pair of inclination portions includes a first curved part having a curved shape and being directly connected to one of the pair of flat plate portions, a second curved part having a curved shape and being directly connected to the long end part of the fixed portion, and a connection part being located between the first curved part and the second curved part and connecting the first curved part and the second curved part, and
   a non-zero inclination angle of at least one part of the other of the pair of inclination portions is larger than a non-zero inclination angle of the connection part of the one of the pair of inclination portions with respect to a center line bisecting a distance between the pair of flat plate portions.

2. The tube according to claim 1, wherein a part of the long end part, which is opposed to the at least one part of the other of the pair of inclination portions, has a tapered surface inclined along the at least one part of the other of the pair of inclination portions.

3. The tube according to claim 1, wherein the other of the pair of inclination portions includes a third curved part having a curved shape and being directly connected to another of the pair of flat plate portions, a fourth curved part having a curved shape and being directly connected to the short end part of the fixed portion, and a protrusion part being located between the third curved part and the fourth curved part and having a curved shape bulged outward.

4. A heat exchanger comprising:
   the tubes according to claim 1;
   a core portion including outer fins that alternate with the tubes to be stacked; and
   a header tank having a through hole through which end parts of the tubes are inserted.

5. The tubes according to claim 1, wherein
   the at least one part of the other of the pair of inclination portions is a first flat part extending straight from the short end part, and
   the other of the pair of inclination portions further includes a second flat part extending straight between the first flat part and the other of the pair of flat plate portions, and
   the inclination angle of the first flat part is larger than an inclination angle of the second flat part with respect to the center line.

6. The tubes according to claim 5, wherein the inclination angle of the second flat part is the same as the inclination angle of the connection part of the one of the pair of inclination portions.

* * * * *